(12) United States Patent
Chen et al.

(10) Patent No.: US 9,570,968 B1
(45) Date of Patent: Feb. 14, 2017

(54) ROTOR OF INDUCTION MOTOR AND METHOD FOR MANUFACTURING THE SAME

(71) Applicant: Shanghai XPT Technology Limited, Shanghai (CN)

(72) Inventors: Ruilin Ray Chen, Troy, MI (US); Jifei Ma, Tianmen (CN)

(73) Assignee: Shanghai XPT Technology Limited, Shanghai (CN)

( * ) Notice: Subject to any disclaimer, the term of this patent is extended or adjusted under 35 U.S.C. 154(b) by 0 days.

(21) Appl. No.: 15/271,235

(22) Filed: Sep. 21, 2016

(30) Foreign Application Priority Data

Sep. 14, 2016 (CN) .......................... 2016 1 0826531

(51) Int. Cl.
*H02K 17/00* (2006.01)
*H02K 17/16* (2006.01)
*H02K 15/00* (2006.01)
*B23K 15/00* (2006.01)

(52) U.S. Cl.
CPC ......... *H02K 17/165* (2013.01); *B23K 15/0046* (2013.01); *B23K 26/21* (2015.10); *H02K 15/0012* (2013.01)

(58) Field of Classification Search
CPC .. H02K 17/165; H02K 15/0012; H02K 17/16; Y10T 29/49012; Y10T 29/49009

USPC ..................................... 310/211; 29/596–598
See application file for complete search history.

(56) References Cited

U.S. PATENT DOCUMENTS

| | | | |
|---|---|---|---|
| 6,345,433 B1* | 2/2002 | Kliman | C21D 6/008 29/598 |
| 2010/0007234 A1* | 1/2010 | Alfermann | B22D 19/0054 310/211 |
| 2012/0019091 A1* | 1/2012 | Hong | H02K 15/0012 310/211 |
| 2015/0333606 A1* | 11/2015 | Hanna | H02K 15/0012 310/211 |

* cited by examiner

*Primary Examiner* — Thanh Lam
(74) *Attorney, Agent, or Firm* — Winston Hsu; Scott Margo (57) ABSTRACT

A rotor of an induction motor includes a core assembly including a plurality of core discs formed with a plurality of slots; a plurality of conductive bars passing through the slots, each of the conductive bars having a first end and a second end respectively extended out of a first end surface and a second end surface of the core assembly; a first end ring assembly including a plurality of first conductive rings stacked on each other and penetrated by the first ends of the conductive bars; and a second end ring assembly including a plurality of second conductive rings stacked on each other and penetrated by the second ends of the conductive bars; wherein the first conductive rings and the second conductive rings are respectively welded to the first ends and the second ends of the conductive bars by electron beam welding or laser welding.

17 Claims, 6 Drawing Sheets

ROTOR OF INDUCTION MOTOR AND METHOD FOR MANUFACTURING THE SAME

BACKGROUND OF THE INVENTION

1. Field of the Invention

The present invention relates to a rotor of an induction motor, and more particularly, to a rotor of an induction motor with end ring assemblies formed by electron beam welding or laser welding.

2. Description of the Prior Art

A rotor of an induction motor generally comprises a shaft and a laminated magnetic core mounted to the shaft. The laminated magnetic core is formed with a plurality of slots for allowing a plurality of conductive bars to pass through. The conductive bars extend out of both ends of the laminated magnetic core, and an end ring or end cap at either end of the laminated magnetic core is configured to mechanically and electrically connect to the conductive bars.

In one well known method of rotor production, the conductive bars and the end rings are integrally formed by casting. However, the conductive bars may shrink after formation, such that the conductive bars are loose in the slots. In addition, bubbles may form in structures of the conductive bars and the end rings, and layers of insulation material on surfaces of the laminated magnetic core may be damaged during the casting process. The prior art provides several techniques for solving the above problem by forming the conductive bars and the end rings (or end caps) separately. For example, US patent application number 2014/0339950 discloses a rotor assembly with end caps welded to conductive bars by electron beam welding. However, the end caps are formed by forging, which requires more complex manufacturing processes. Moreover, each of the conductive bars is welded to the end cap at one single position, thus connection reliability between the conductive bars and the end caps may not be sufficient for long term operation.

SUMMARY OF THE INVENTION

The present invention provides a rotor of an induction motor, comprising a core assembly comprising a plurality of core discs stacked on each other, each of the core discs being formed with a plurality of slots; a plurality of conductive bars passing through the slots of the plurality of core discs, each of the conductive bars having a first end extended out of a first end surface of the core assembly, and a second end extended out of a second end surface of the core assembly; a first end ring assembly adjacent to the first end surface of the core assembly, the first end ring assembly comprising a plurality of first conductive rings stacked on each other and penetrated by the first ends of the conductive bars; and a second end ring assembly adjacent to the second end surface of the core assembly, the second end ring assembly comprising a plurality of second conductive rings stacked on each other and penetrated by the second ends of the conductive bars; wherein the first conductive rings are welded to the first ends of the conductive bars by electron beam welding or laser welding, and the second conductive rings are welded to the second ends of the conductive bars by electron beam welding or laser welding; and wherein a quantity of the first conductive rings is equal to or greater than 2, and a quantity of the second conductive rings is equal to or greater than 2.

The present invention further provides a method for manufacturing a rotor of an induction motor. The method comprises providing a core assembly that comprises a plurality of core discs stacked on each other, wherein each of the core discs is formed with a plurality of slots; inserting a plurality of conductive bars into the plurality of slots, wherein each of the conductive bars has a first end extended out of a first end surface of the core assembly, and a second end extended out of a second end surface of the core assembly; mounting a first end ring assembly and a second end ring assembly respectively to the first ends and the second ends of the conductive bars, wherein the first end ring assembly comprises a plurality of first conductive rings stacked on each other and penetrated by the first ends of the conductive bars, and the second end ring assembly comprises a plurality of second conductive rings stacked on each other and penetrated by the second ends of the conductive bars; welding the first conductive rings to the first ends of the conductive bars by electron beam welding or laser welding; and welding the second conductive rings to the second ends of the conductive bars by electron beam welding or laser welding.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
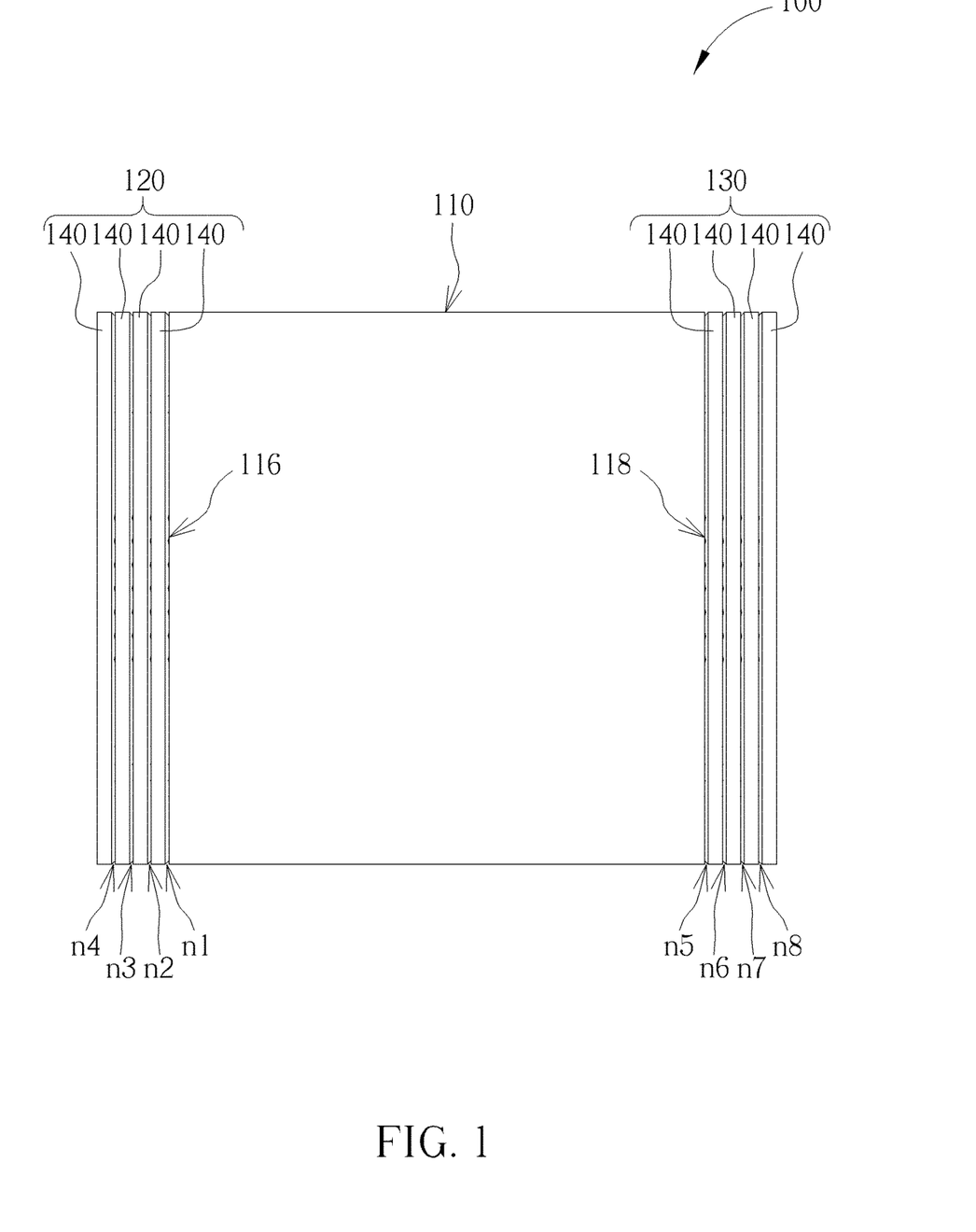
FIG. 1 is a diagram showing a rotor of an induction motor of the present invention.
Figure 2:
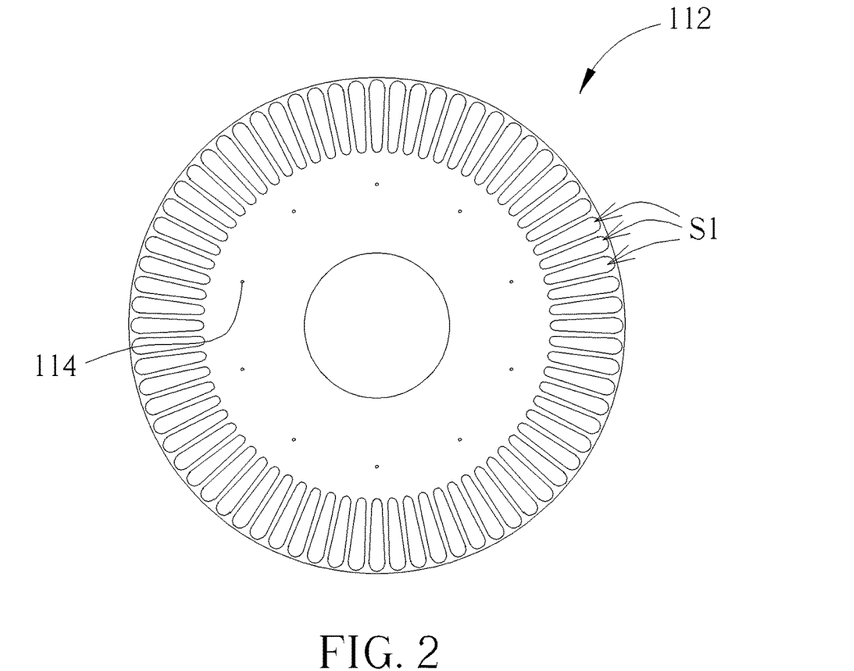
FIG. 2 is a diagram showing a core disc of a core assembly of the present invention.
Figure 3:
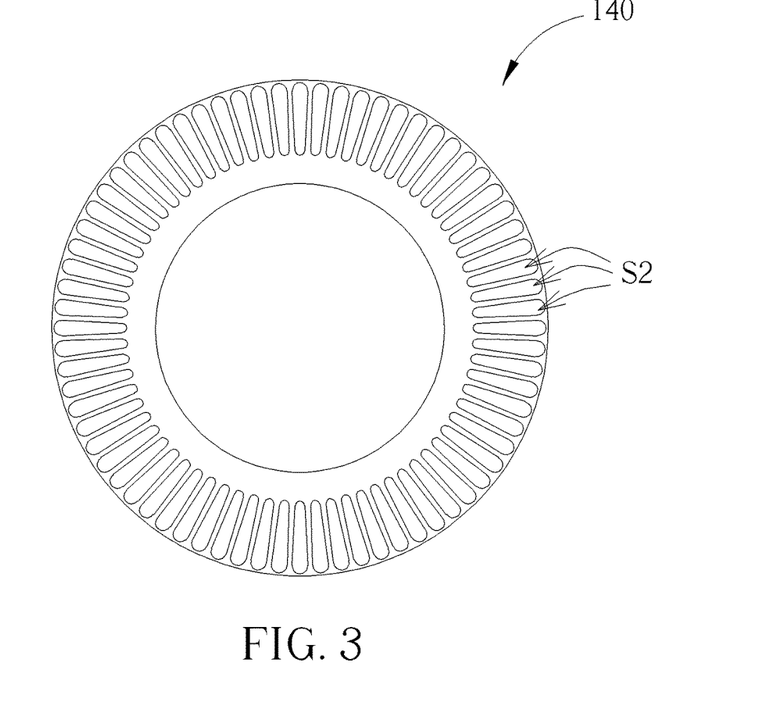
FIG. 3 is a diagram showing a conductive ring of an end ring assembly of the present invention.

Please refer to FIG. 1 to FIG. 3. FIG. 1 is a diagram showing a rotor of an induction motor of the present invention. FIG. 2 is a diagram showing a core disc of a core assembly of the present invention. FIG. 3 is a diagram showing a conductive ring of an end ring assembly of the present invention. The rotor 100 of the induction motor of the present invention comprises a core assembly 110, a first end ring assembly 120, and a second end ring assembly 130. The core assembly 110 comprises a plurality of core discs 112 stacked on each other. The core discs 112 are mutually connected through the connecting points 114. For example, the core discs 112 can be riveted together through the connecting points 114. Each of the core discs 112 is formed with a plurality of slots S1. The core discs 112 of the core assembly 110 can be formed by stamping. Preferably, the core discs 112 can be made of steel.

The first end ring assembly 120 is adjacent to a first end surface 116 of the core assembly 110. The second end ring assembly 130 is adjacent to a second end surface 118 of the core assembly 110. Both the first end ring assembly 120 and the second end ring assembly 130 comprise a plurality of conductive rings 140 stacked on each other. Specifically, a quantity of the conductive rings 140 of the first end ring assembly 120 is equal to or greater than 2, and a quantity of the conductive rings 140 of the second end ring assembly 130 is equal to or greater than 2. Each of the conductive rings 140 is formed with a plurality of enclosed slots S2. The conductive rings 140 of the first end ring assembly 120 and the second end ring assembly 130 can be formed by stamping, in order to simply manufacturing processes of the rotor 100 of the present invention. Preferably, the conductive rings 140 can be made of copper.

In addition, as shown in FIG. 1, a notch n2, n3, n4 is formed on a joint area between outer edges of two adjacent conductive rings 140 of the first end ring assembly 120, and a notch n6, n7, n8 is formed on a joint area between outer edges of two adjacent conductive rings 140 of the second end ring assembly 130. Moreover, a notch n1 is formed on a joint area between outer edges of the core assembly 110 and the first end ring assembly 120, and a notch n5 is formed on a joint area between outer edges of the core assembly 110 and the second end ring assembly 130.

Furthermore, a layer of insulation material can be arranged on the first end surface 116 of the core assembly 110 for preventing conduction between the first end ring assembly 120 and the core assembly 110. Similarly, a layer of insulation material can also be arranged on the second end surface 118 of the core assembly 110 for preventing conduction between the second end ring assembly 130 and the core assembly 110.

Figure 4:
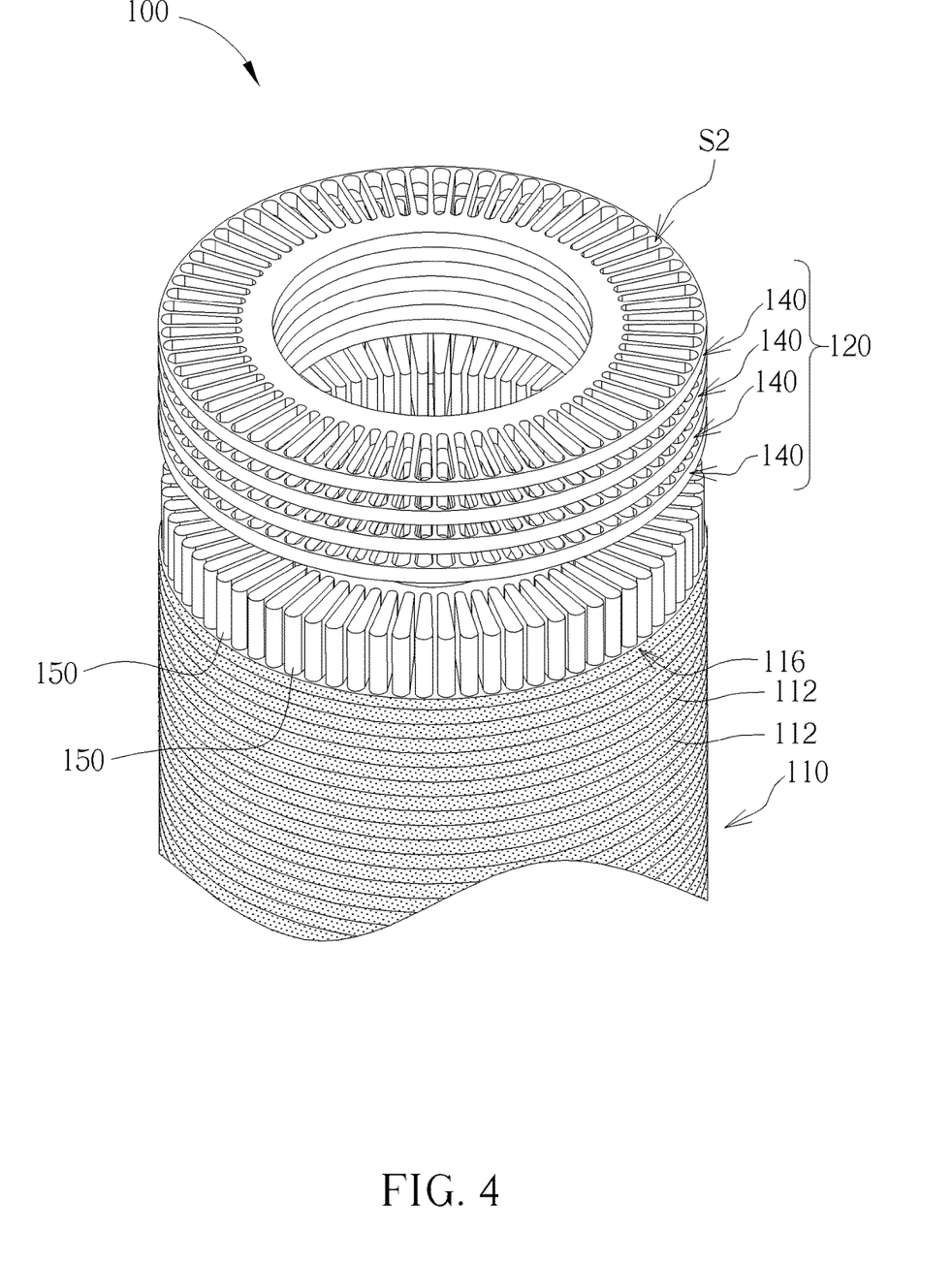
FIG. 4 is a partial exploded view of the rotor in FIG. 1.

Please refer to FIG. 4, and refer to FIG. 1 to FIG. 3 as well. FIG. 4 is a partial exploded view of the rotor in FIG. 1. The rotor 100 of the present invention further comprises a plurality of conductive bars 150. The conductive bars 150 can be formed by extrusion molding. Preferably, the conductive bars 150 can be made of copper. The conductive bars 150 pass through the slots S1 of the plurality of core discs 112. First ends of the conductive bars 150 extend out of the first end surface 116 of the core assembly 110. The enclosed slots S2 of the conductive rings 140 of the first end ring assembly 120 allow the first ends of the conductive bars 150 to penetrate through. The enclosed slot S2 of the conductive ring 140 of the first end ring assembly 120 is configured to completely enclose a periphery of the first end of a corresponding conductive bar 150, so as to improve conductivity and structural strength between the first end ring assembly 120 and the conductive bars 150. Moreover, since the rotor 100 is symmetrically arranged, second ends (not shown) of the conductive bars 150 also extend out of the second end surface 118 of the core assembly 110. Similarly, the enclosed slots S2 of the conductive rings 140 of the second end ring assembly 130 allow the second ends of the conductive bars 150 to penetrate through. The enclosed slot S2 of the conductive ring 140 of the second end ring assembly 130 is configured to completely enclose a periphery of the second end of a corresponding conductive bar 150, so as to improve conductivity and structural strength between the second end ring assembly 130 and the conductive bars 150.

Figure 5:
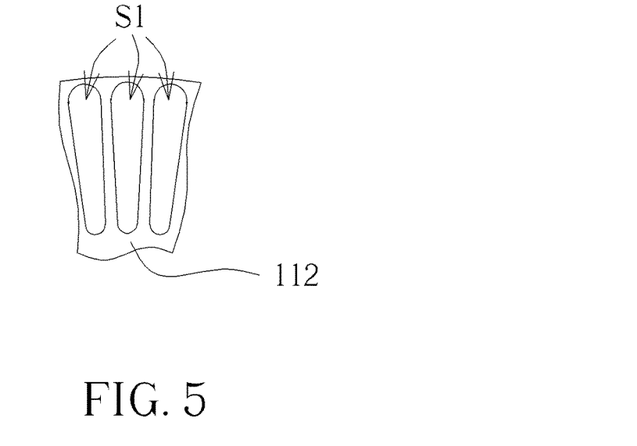
FIG. 5 is a detailed view of the slots of the core disc of the present invention.
Figure 6:
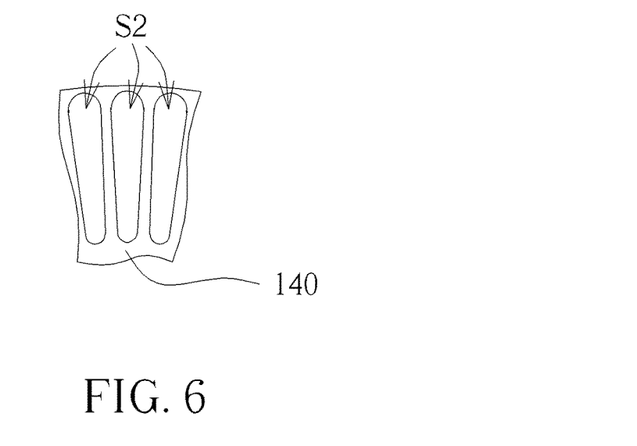
FIG. 6 is a detailed view of the enclosed slots of the conductive ring of the present invention.
Figure 7:
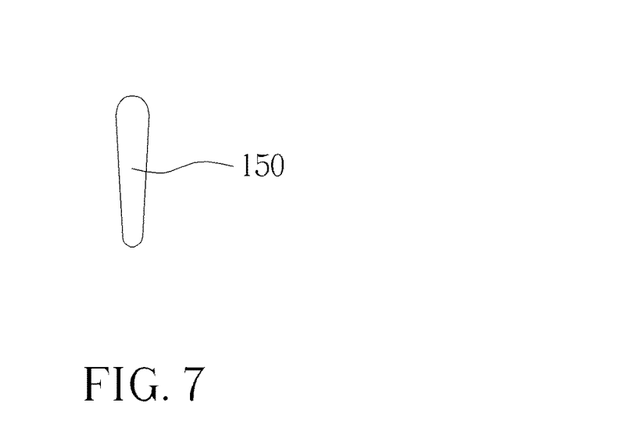
FIG. 7 is a cross-sectional view of a conductive bar of the present invention.

Please refer to FIG. 5 to FIG. 7. FIG. 5 is a detailed view of the slots of the core disc of the present invention. FIG. 6 is a detailed view of the enclosed slots of the conductive ring of the present invention. FIG. 7 is a cross-sectional view of a conductive bar of the present invention. The conductive bar 150 has essentially the same shape as the slot S1 of the core disc and the enclosed slot S2 of the conductive ring. Dimensions of the conductive bar 150 are slightly smaller than dimensions of the slot S1 and the enclosed slot S2, this allows the conductive bar 150 to pass through the slot S1 and the enclosed slot S2. Since the core disc 112 and the conductive ring 140 are formed by stamping, the conductive bar 150 can be precisely fit with the slot S1 and the enclosed slot S2.

Figure 8:
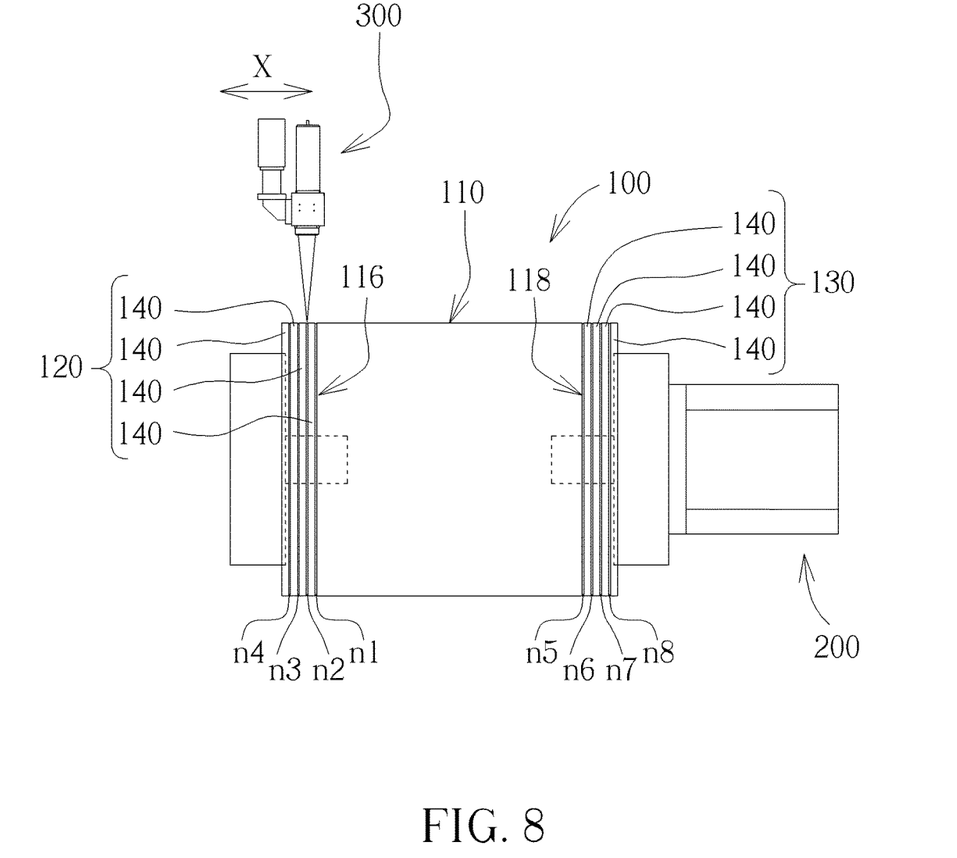
FIG. 8 is a diagram illustrating a welding process of the end ring assembly of the present invention.

Please refer to FIG. 8. FIG. 8 is a diagram illustrating a welding process of the end ring assembly of the present invention. Once the first end ring assembly 120 and the second end ring assembly 130 are respectively mounted to the first ends and the second ends of the conductive bars, a fixture 200 can be utilized for fixing both ends of the rotor 100. A welding machine 300 is further utilized for welding the conductive rings 140 of the first end ring assembly 120 to the first ends of the conductive bars 150, and for welding the conductive rings 140 of the second end ring assembly 130 to the second ends of the conductive bars 150. For example, the welding machine 300 can direct an electron or laser beam toward the notch n2 on the joint area between outer edges of two adjacent conductive rings 140 of the first end ring assembly 120 for welding the two conductive rings 140, which are adjacent to the notch n2, to the first end of one of the conductive bars 150. The rotor 100 is then rotated by the fixture 200 for directing the electron or laser beam toward other positions on the notch n2, for sequentially welding the conductive rings 140 adjacent to the notch n2 to the first ends of the rest conductive bars 150. Meanwhile, the two conductive rings adjacent to the notch n2 are also welded to each other. Thereafter, the welding machine 300 (and/or the rotor 100) can be moved along a direction X parallel to a rotational axis of the rotor 100, and the welding machine 300 then directs an electron or laser beam toward the notch n3 on the joint area between outer edges of two adjacent conductive rings 140 of the first end ring assembly 120 for welding the two conductive rings 140, which are adjacent to the notch n3, to the first end of one of the conductive bars 150. The rotor 100 is then rotated by the fixture 200 for directing the electron or laser beam toward other positions on the notch n3, for sequentially welding the conductive rings adjacent to the notch n3 to the first ends of the rest conductive bars. Meanwhile, the two conductive rings adjacent to the notch n3 are also welded to each other. Similarly, the welding machine 300 can further direct electron or laser beams toward the notch n4 for welding the conductive rings 140, which are adjacent to the notch n4, to the first ends of the conductive bars 150, and welding the conductive rings 140 adjacent to the notch n4 together. As such, the process of welding the conductive rings 140 of the first end ring assembly 120 together and the process of welding the conductive rings 140 of the first end ring assembly 120 to the first ends of the conductive bars 150 can be completed simultaneously. Moreover, the conductive ring 140 adjacent to the first end surface 116 of the core assembly 110 is not welded to the first end surface 116 of the core assembly 110.

After welding all of the conductive rings 140 of the first end ring assembly 120 to the first ends of the conductive bars 150, the welding machine 300 can sequentially direct electron or laser beams toward the notches n6-n8 in order to weld the conductive rings 140 of the second end ring assembly 130 to the second ends of the rest conductive bars 150, and welding the conductive rings 140 of the second end ring assembly 130 together. The process of welding the conductive rings 140 of the second end ring assembly 130 to the second ends of the conductive bars 150 is similar to the process of welding the conductive rings 140 of the first end ring assembly 120 to the first ends of the conductive bars 150, thus no further illustration is provided. Similarly, the process of welding the conductive rings 140 of the second end ring assembly 130 together and the process of welding the conductive rings 140 of the second end ring assembly 130 to the second ends of the conductive bars 150 can be completed simultaneously. Moreover, the conductive ring 140 adjacent to the second end surface 118 of the core assembly 110 is not welded to the second end surface 118 of the core assembly 110.

According to the above welding process, each of the conductive bars 150 is respectively welded to the first end ring assembly 120 and the second end ring assembly 130 at multiple positions, such that connection reliability between the conductive bars 150 and the first and second end ring assemblies 120, 130 can be increased. Moreover, welding between the adjacent conductive rings 140 of the first and second end ring assemblies 120, 130 and welding between the conductive rings 140 and the conductive bars 150 are completed at a same time, such that manufacturing processes of the rotor 100 can be simplified.

In the present invention, power of the electron beam welding or laser welding is between 4 kw and 20 kw. In addition, for increasing welding efficiency, two welding machines can be utilized for welding the conductive rings 140 of the first end ring assembly 120 and the second end ring assembly 130 respectively to the first ends and the second ends of the conductive bars 150 simultaneously.

Figure 9:
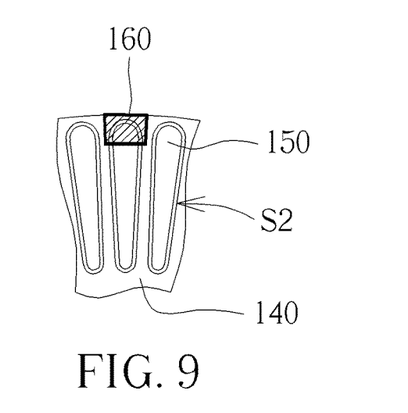
FIG. 9 is a diagram showing a welding zone during the welding process.

Please refer to FIG. 9. FIG. 9 is a diagram showing a welding zone 160 during the welding process. Energy of the electron or laser beam can be directed to the welding zone 160 ranging from a circumferential side surface of the conductive ring 140 to an outer edge of the conductive bar 150. A depth of the welding zone 160 is preferably between 4 mm to 6 mm. Since the electron or laser beams are directed to the notches n2-n4 and n6-n8, energy of the electron or laser beam can be easily directed to the outer edge of the conductive bar 150 through the notches n2-n4 and n6-n8 without significant energy loss, in order to further increase the connection reliability between the conductive bar 150 and the first and second end ring assemblies 120, 130.

Figure 10:
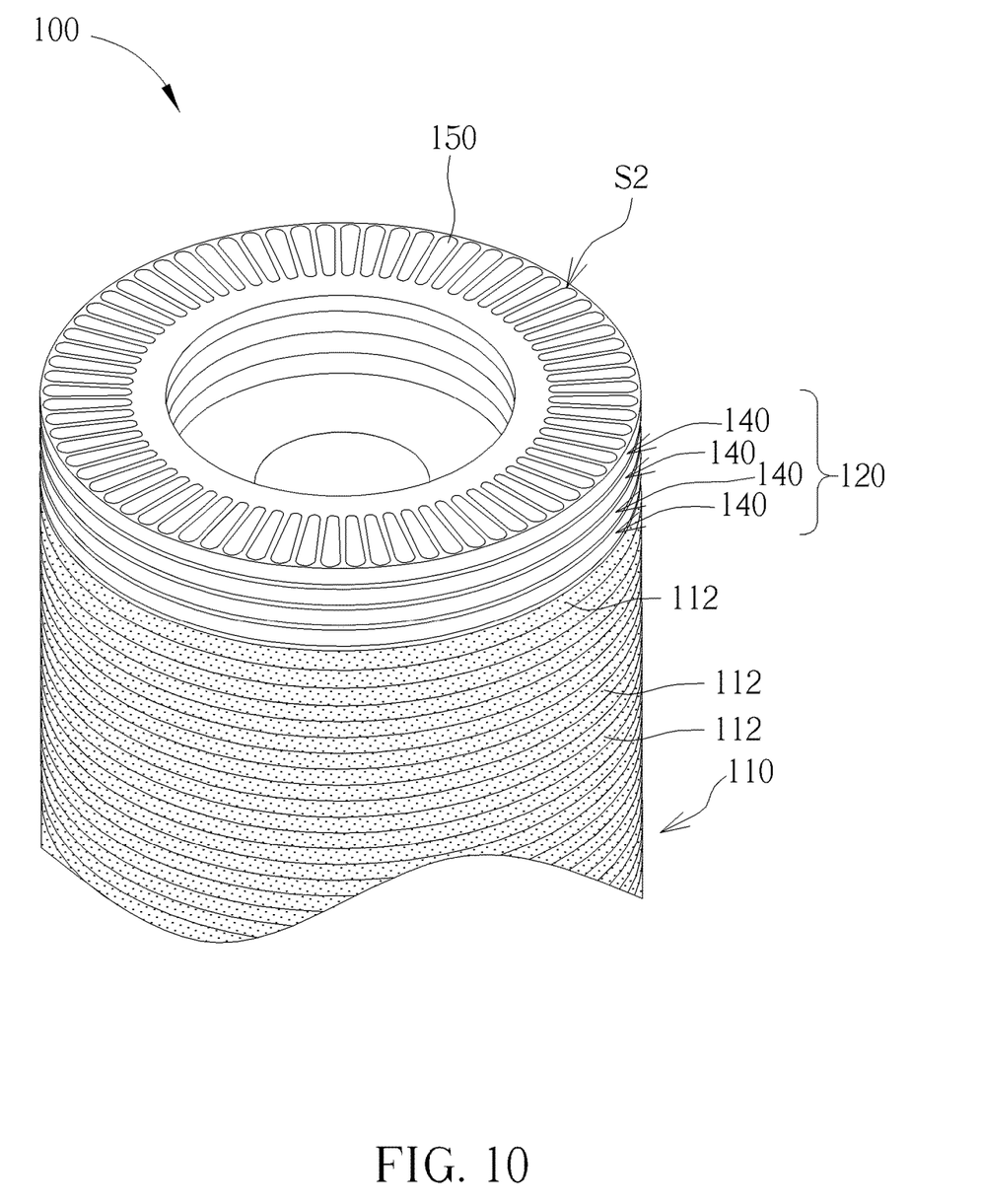
FIG. 10 is a diagram showing the rotor after the welding process.

Please refer to FIG. 10. FIG. 10 is a diagram showing the rotor after the welding process. After the welding process, surfaces of the rotor 100 can be grinded for removing uneven edges at the welding positions. On the other hand, the core assembly 110 of the rotor 100 can be further mounted to a shaft (not shown) after the welding process.

In contrast to the prior art, the rotor of the present invention comprises end ring assemblies consisted of a plurality of conductive rings formed by stamping to have enclosed slots precisely fitting with the conductive bars, such that the conductivity and structural strength between the end ring assemblies and the conductive bars can be improved. Further, each of the conductive bars is welded to the end ring assemblies at multiple positions by electron beam welding or laser welding, thus the connection reliability between the conductive bars and the end ring assemblies can be increased. Moreover, welding between the adjacent conductive rings of the end ring assemblies and welding between the conductive rings of the end ring assemblies and the conductive bars are completed at the same time, such that the manufacturing processes of the rotor can be simplified.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A rotor of an induction motor, comprising:
    a core assembly, comprising a plurality of core discs stacked on each other, each of the core discs being formed with a plurality of slots;
    a plurality of conductive bars, passing through the slots of the plurality of core discs, each of the conductive bars having a first end extended out of a first end surface of the core assembly, and a second end extended out of a second end surface of the core assembly;
    a first end ring assembly, adjacent to the first end surface of the core assembly, the first end ring assembly comprising a plurality of first conductive rings stacked on each other and penetrated by the first ends of the conductive bars; and
    a second end ring assembly, adjacent to the second end surface of the core assembly, the second end ring assembly comprising a plurality of second conductive rings stacked on each other and penetrated by the second ends of the conductive bars;
    wherein the first conductive rings are welded to the first ends of the conductive bars by electron beam welding or laser welding, and the second conductive rings are welded to the second ends of the conductive bars by electron beam welding or laser welding;
    wherein a quantity of the first conductive rings is equal to or greater than 2, and a quantity of the second conductive rings is equal to or greater than 2.

2. The rotor of claim 1, wherein two adjacent first conductive rings are welded to each other when the first conductive rings are welded to the first ends of the conductive bars by electron beam welding or laser welding, and two adjacent second conductive rings are welded to each other when the second conductive rings are welded to the second ends of the conductive bars by electron beam welding or laser welding.

3. The rotor of claim 1, wherein the first conductive rings and the second conductive rings are formed by stamping.

4. The rotor of claim 1, wherein a first notch is formed on a joint area between outer edges of two adjacent first conductive rings, and a second notch is formed on a joint area between outer edges of two adjacent second conductive rings.

5. The rotor of claim 1, wherein each of the first conductive rings is formed with a plurality of first enclosed slots enclosing the first ends of the conductive bars, and each of the second conductive rings is formed with a plurality of second enclosed slots enclosing the second ends of the conductive bars.

6. The rotor of claim 1, wherein the first conductive ring adjacent to the first end surface of the core assembly is not welded to the first end surface of the core assembly, and the second conductive ring adjacent to the second end surface of the core assembly is not welded to the second end surface of the core assembly.

7. The rotor of claim 1 further comprising:
    a first layer of insulation material arranged on the first end surface of the core assembly; and
    a second layer of insulation material arranged on the second end surface of the core assembly.

8. The rotor of claim 1, wherein power of the electron beam welding or laser welding is between 4 kw and 20 kw.

9. A method for manufacturing a rotor of an induction motor, comprising:
providing a core assembly comprising a plurality of core discs stacked on each other, wherein each of the core discs is formed with a plurality of slots;
inserting a plurality of conductive bars into the plurality of slots, wherein each of the conductive bars has a first end extended out of a first end surface of the core assembly, and a second end extended out of a second end surface of the core assembly;
mounting a first end ring assembly and a second end ring assembly respectively to the first ends and the second ends of the conductive bars, wherein the first end ring assembly comprises a plurality of first conductive rings stacked on each other and penetrated by the first ends of the conductive bars, and the second end ring assembly comprises a plurality of second conductive rings stacked on each other and penetrated by the second ends of the conductive bars;
welding the first conductive rings to the first ends of the conductive bars by electron beam welding or laser welding; and
welding the second conductive rings to the second ends of the conductive bars by electron beam welding or laser welding.

10. The method of claim 9, wherein the step of welding the first conductive rings to the first ends of the conductive bars by electron beam welding or laser welding comprises:
directing a first electron or laser beam toward a joint area between outer edges of two adjacent first conductive rings, in order to welding the two adjacent first conductive rings and the first ends of the conductive bars together; and
wherein the step of welding the second conductive rings to the second ends of the conductive bars by electron beam welding or laser welding comprises:
directing a second electron or laser beam toward a joint area between outer edges of two adjacent second conductive rings for welding the two adjacent second conductive rings and the second ends of the conductive bars together.

11. The method of claim 10 further comprising rotating the core assembly during electron beam welding or laser welding.

12. The method of claim 10, wherein the first electron or laser beam is directed toward a first notch on the joint area between outer edges of the two adjacent first conductive rings, the second electron or laser beam is directed toward a second notch on the joint area between outer edges of the two adjacent second conductive rings.

13. The method of claim 9 further comprising forming a first notch on the joint area between outer edges of the two adjacent first conductive rings, and forming a second notch on the joint area between outer edges of the two adjacent second conductive rings.

14. The method of claim 9 further comprising forming the first conductive rings and the second conductive rings by stamping.

15. The method of claim 9 further comprising:
forming a plurality of first enclosed slots, which are configured to enclose the first ends of the conductive bars, on each of the first conductive rings; and
forming a plurality of second enclosed slots, which are configured to enclose the second ends of the conductive bars, on each of the second conductive rings.

16. The method of claim 9, wherein the first conductive ring adjacent to the first end surface of the core assembly is not welded to the first end surface of the core assembly, and the second conductive ring adjacent to the second end surface of the core assembly is not welded to the second end surface of the core assembly.

17. The method of claim 9, wherein power of the electron beam welding or laser welding is between 4 kw and 20 kw.

* * * * *